United States Patent Office 3,318,677
Patented May 9, 1967

3,318,677
PLANT DWARFING COMPOSITION AND METHOD
Howard A. Hageman, Southbury, and Winchester L. Hubbard, Woodbridge, Conn., assignors to United States Rubber Company, New York, N.Y., a corporation of New Jersey
No Drawing. Original application Feb. 16, 1961, Ser. No. 89,655. Divided and this application Nov. 13, 1963, Ser. No. 323,267
14 Claims. (Cl. 71—2.5)

This application is a division of application Ser. No. 89,655, filed Feb. 16, 1961, now abandoned.

This invention relates to plant growth regulants.

The plant growth regulants of the present invention are new compounds, namely N-disubstitutedamino amic acids, in which the disubstituted amino radical is selected from dialkylamino radicals having 1 to 12 carbon atoms in each alkyl group, 1-pyrrolidyl, 1-piperidyl and 4-morpholinyl radicals, and the amic acid is selected from hexahydrophthalamic acid, 1,2,3,6-tetrahydrophthalamic acid, 3,6-endoxy-$\Delta^4$-tetrahydrophthalamic acid, and 3,6-endomethylene-$\Delta^4$-tetrahydrophthalamic acid, and the salts and imides of said N-disubstitutedamino amic acids.

The N-disubstitutedamino amic acids are prepared by reacting the selected 1,1-disubstituted hydrazine with the anhydride of the selected dicarboxylic acid. The imides of these acids are prepared by removing water from the acid by means of acetic anhydride.

Illustrative reactions for the formation of N-dimethylamino-3,6-endomethylene-$\Delta^4$-tetrahydrophthalamic acid and N-dimethylamino-3,6-endomethylene-$\Delta^4$-tetrahydrophthalimide are as follows:

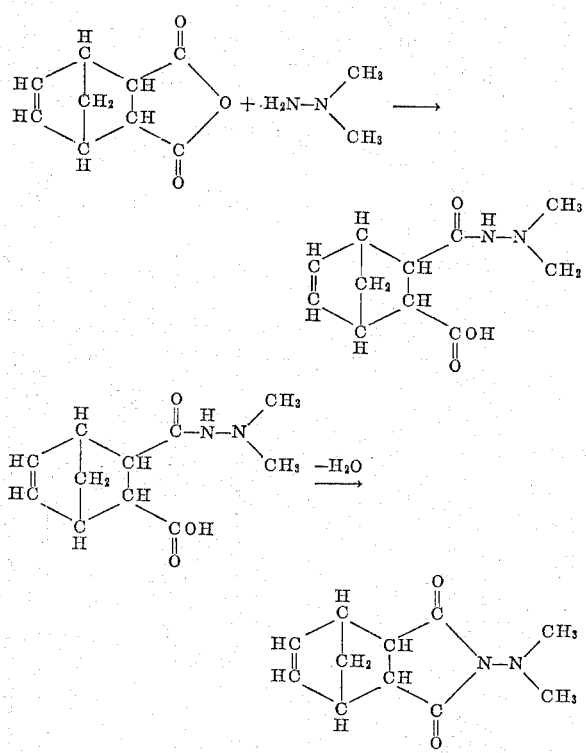

The acids may be used as plant growth regulants in the form of the free acids or their equivalent salts, such as the alkali salts, i.e., alkali metal, ammonium or amine (substituted ammonium) salts, e.g., sodium, potassium, ammonium, methyl ammonium, dimethyl ammonium, trimethyl ammonium, ethyl ammonium, ethanol ammonium, diethanol ammonium, or triethanol ammonium salts, since the salts give equilvalent results. The salts may readily be formed directly from the acid and a selected base such as an alkali-metal hydroxide or carbonate, or ammonia, or an amine.

After testing a variety of N-disubstitutedamino amic acids and their imides, it has been found that the essential structural arrangement for growth regulant activity is one in which the carboxyl group of the acid is removed by two carbon atoms from the

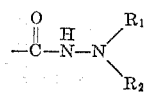

moiety, and the intermediate two carbon moiety can not be part of an aromatic ring. The $R_1$ and $R_2$ in the

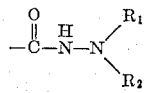

moiety each stand for an alkyl group having 1 to 12 carbon atoms or $R_1$ and $R_2$ compositely stand for a $-(CH_2)_4-$, $-(CH_2)_5-$ or $(-CH_2CH_2)_2O$ group to give the disubstituted amino radicals referred to above. In the chemicals of the present invention, the intermediate two carbon moiety is part of a functionally cycloaliphatic grouping.

Examples of chemicals of the present invention are:
N-dimethylaminohexahydrophthalamic acid,
Sodium N-dimethylaminohexahydrophthalamate,
N-dimethylaminohexahydrophthalimide,
N-dimethylamino-1,2,3,6-tetrahydrophthalamic acid,
Ammonium salt of N-dimethylamino-1,2,3,6-tetrahydrophthalamic acid,
N-dimethylamino-3,6-endoxy-$\Delta^4$-tetrahydrophthalamic acid,
N-dimethylamino-3,6-endomethylene-$\Delta^4$-tetrahydrophthalamic acid,
Diethanolammonium salt of N-dimethylamino-3,6-endomethylene-$\Delta^4$-tetrahydrophthalamic acid,
N-dimethylamino-3,6-endomethylene-$\Delta^4$-tetrahydrophthalimide.

Specific illustrative examples of the preparation of the compounds of the present invention are shown in Examples 1 and 2 below:

EXAMPLE 1

Preparation of N-dimethylamino-3,6-endomethylene-$\Delta^4$-tetrahydrophthalamic acid To a solution of 16.4 g. (.10 mole) of 3,6-endomethylene-$\Delta^4$-tetrahydrophthalic anhydride in 30 g. of acetonitrile was added, over 10 minutes, a solution of 6.0 g. (.10 mole) of 1,1-dimethylhydrazine in 20 g. of acetonitrile. During the addition the temperature of the reaction mixture was kept below 35° C. by use an ice bath. After keeping the reaction mixture in an ice bath for 1½ hours the precipitated solid was collected by filtration and washed on the funnel with ether. There was obtained 11 g. of colorless crystals of M.P. 124–125° C.

The N-dioctylamino, N-didodecylamino, N-(4-morpholinyl), N-(1-pyrrolidyl) and N-(1-piperidyl)-3,6-endomethylene-$\Delta^4$-tetrahydrophthalamic acids may similarly be prepared from 1,1-dioctyl hydrazine, 1,1-didodecylhydrazine, N-aminomorpholine, N-aminopyrrolidine, and N-aminopiperidine, respectively and 3,6-endomethylene-$\Delta^4$-tetrahydrophthalic anhydride. The other N-disubstitutedamino amic acids may similarly be prepared from the anhydride of the selected hydrophthalic acid.

EXAMPLE 2

*Preparation of N-dimethylene-3-6-endomethylene-
$\Delta^4$-tetrahydrophthalimide*

To 34 g. (.15 mole) of N-dimethylamino-3,6-endomethylene-$\Delta^4$-tetrahydrophthalamic acid of M.P. 124–125° C. was added 30 g. (.30 mole) of acetic anhydride and 30 ml. of benzene. After heating this mixture to 80–90° C. for ½ hour, there resulted a clear, colorless solution. This solution was then distilled under a pressure of 5 to 8 mm. to remove the benzene, acetic acid, and acetic anhydride. The crystalline residue was then dissolved in 75 ml. of hot benzene, the solution filtered and the filtrate diluted with 50 ml. of n-hexane. After cooling this solution in an ice bath, the precipitated crystals were collected by filtration. There was obtained 22 g. of N-dimethylamino - 3,6 - endomethylene-$\Delta^4$-tetrahydrophthalimide as colorless crystals of M.P. 132–135° C.

This compound has also been prepared by treating N-dimethylaminomaleimide with a molar equivalent of cyclopentadiene in benzene solution.

The chemicals of the present invention may be applied to plants, which term includes various plant parts such as seeds, flowers, fruits, vegetables, roots and foliage in various manners. Seeds may be treated directly with the chemical before planting, or seeds may be treated with the chemical by incorporating the chemical in the soil before or after planting the seeds. The chemicals may be applied to plants in an inert medium as a dust in admixture with a powdered solid carrier, such as the various mineral silicates, e.g., mica, talc, pyrophllite and clays or as an aqueous composition. The chemicals may be applied in admixture with small amounts of surface-active wetting agents, which may be anionic, non-ionic, or cationic surface-active agents, generally as aqueous compositions. The chemicals may be dissolved in organic solvents such as acetone, benzene, or kerosene, and the solutions of the chemicals emulsified in water with the aid of surface-active agents. Such surface-active agents are well known and reference is made to U.S. Patent No. 2,547,724, columns 3 and 4, for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

The effectiveness of the chemicals of the present invention as plant growth regulants, and particularly as dwarfing agents, is illustrated in the following examples:

EXAMPLE A

This example and Example B illustrate the treatment of growing plants with the chemicals of the present invention.

A water solution was prepared containing 5000 parts per million (p.p.m.) of N-dimethylaminohexahydrophthalamic acid (M.P. 130–132° C.) and a small amount of a surface-active wetting agent (polyoxyethylene sorbitan monolaurate) which is known to be inactive in the tests run.

Peanut plants in the 2- to 3-leaf stage were sprayed to run off with the above aqueous compositon. The treated plants and untreated control plants were then placed in a chamber having 100% humidity and a temperature of 75° F. After 24 hours, they were taken out and placed in a greenhouse. The plants were examined two to four weeks after the application of the chemical. There was a decided dwarfing or shortening of the internodes of the peanut plants treated with the chemical on comparison with the untreated control plants.

EXAMPLE B

Water solutions were prepared containing 5000 p.p.m. of various chemicals of the invention and a small amount of a surface-active agent (polyoxyethylene sorbitan monolaurate) which is known to be inactive in the tests run.

Pinto bean plants after the two primary leaves were fully expanded and the first trifoliate leaf was just beginning to expand were sprayed to run off with aqueous compositions prepared as above containing 5000 p.p.m. of N-dimethylamino-1,2,3,6-tetrahydrophthalamic acid (viscous liquid), N - dimethylamino-3,6-endoxy-$\Delta^4$-tetrahydrophthalamic acid (M.P. 85–87° C.) and N-dimethylamino-3,6 - endomethylene-$\Delta^4$-tetrahydrophthalamic acid (M.P. 124–125° C.). The treated plants and untreated control plants were then placed in a chamber having 100% humidity and a temperature of 75° F. After 24 hours, they were taken out and placed in a greenhouse. The plants were examined two to four weeks after application of the chemicals. There was a decided dwarfing of the pinto bean plants treated with the chemicals on comparison with the untreated control plants.

EXAMPLE C

This example illustrates seed treatment with the chemicals by incorporating the chemicals in the soil.

Two-tenths of a gram of N-dimethylamino-3,6-endomethylene-$\Delta^4$-tetrahydrophthalimide (M.P. 133–135° C.) was mixed uniformly with ¼ lb. of dry sand. The sand and chemical mixture was then added to four and a half pounds of a 4:1 soil and sand mixture, and was tumbled for five minutes. At the end of this time, the chemical was uniformly distributed throughout the soil and sand mixture at a rate of one hundred parts of the chemical per million parts of the soil and sand. The thus treated soil and sand were then placed in 4-inch pots in which pinto bean seeds were planted. Pinto bean seeds were also planted in pots containing untreated control soil and sand. Observations after two to four weeks showed definite dwarfing of the plants from seeds that were planted in soil treated with the chemical of the present invention on comparison with the plants from seeds that were planted in the untreated control soil.

Having thus described our invention, what we claim and desire to protect by Letters Patent is:

1. A plant growth regulant composition comprising a plant dwarfing effective amount of a compound selected from the group consisting of N-disubstitutedamino amic acids, in which the disubstituted amino radical is selected from the group consisting of dialkylamino radicals having 1 to 12 carbon atoms in each alkyl group, 1-pyrrolidyl, 1-piperidyl and 4-morpholinyl radicals, and the amic acid is selected from the group consisting of hexahydrophthalamic acid, 1,2,3,6-tetrahydrophthalamic acid, 3,6-endoxy-$\Delta^4$-tetrahydrophthalamic acid and 3,6-endomethylene-$\Delta^4$-tetrahydrophthalamic acid, and the alkali metal, ammonium or amine salts and imides of said N-disubstituted-amino amic acids, said composition containing a surface-active wetting agent.

2. A plant growth regulant composition comprising a plant dwarfing effective amount of N-dimethylaminohexahydrophthalamic acid and a surface-active wetting agent.

3. A plant growth regulant composition comprising a plant dwarfing effective amount of N-dimethylamino-1,2,3,6-tetrahydrophthalamic acid and a surface-active wetting agent.

4. A plant growth regulant composition comprising a plant dwarfing effective amount of N-dimethylamino-3,6-endoxy-$\Delta^4$-tetrahydrophthalamic acid and a surface-active wetting agent.

5. A plant growth regulant composition comprising a plant dwarfing effective amount of N-dimethylamino-3,6-endomethylene-$\Delta^4$-tetrahydrophthalamic acid and a surface-active wetting agent.

6. A plant growth regulant composition comprising a plant dwarfing effective amount of N-dimethylamino-3,6-endomethylene-$\Delta^4$-tetrahydrophthalimide and a surface-active wetting agent.

7. The method of regulating plant growth which comprises treating plants with a plant dwarfing effective amount of a compound selected from the group consisting of N-disubstitutedamino amic acids, in which the disubstituted amino radical is selected from the group consisting of dialkylamino radicals having 1 to 12 carbon atoms in each alkyl group, 1-pyrrolidyl, 1-piperidyl and 4-morpholinyl radicals, and the amic acid is selected from the group consisting of hexahydrophthalamic acid, 1,2,3,6-tetrahydrophthalamic acid, 3,6-endoxy-$\Delta^4$-tetrahydrophthalamic acid and 3,6-endomethylene-$\Delta^4$-tetrahydrophthalamic acid, and the alkali metal, ammonium or amine salts and imides of said N-disubstitutedamino amic acids.

8. The method of regulating plant growth which comprises treating plants with a plant dwarfing effective amount of N-dimethylamino-3,6-endomethylene-$\Delta^4$-tetrahydrophthalamic acid.

9. The method of regulating plant growth which comprises treating plants with a plant dwarfing effective amount of N-dimethylamino-1,2,3,6-tetrahydrophthalamic acid.

10. The method of regulating plant growth which comprises treating growing plants with a plant dwarfing effective amount of a compound selected from the group consisting of N-disubstitutedamino amic acids, in which the disubstituted amino radical is selected from the group consisting of dialkylamino radicals having 1 to 12 carbon atoms in each alkyl group, 1-pyrrolidyl, 1-piperidyl and 4-morpholinyl radicals, and the amic acid is selected from the group consisting of hexahydrophthalamic acid, 1,2,3,6-tetrahydrophthalamic acid, 3,6-endoxy-$\Delta^4$-tetrahydrophthalamic acid and 3,6-endomethylene-$\Delta^4$-tetrahydrophthalamic acid, and the alkali metal, ammonium or amine salts and imides of said N-disubstitutedamino amic acids.

11. The method of regulating plant growth which comprises treating seeds with a plant dwarfing effective amount of a compound selected from the group consisting of N-disubstitutedamino amic acids, in which the disubstituted amino radical is selected from the group consisting of dialkylamino radicals having 1 to 12 carbon atoms in each alkyl group, 1-pyrrolidyl, 1-piperidyl and 4-morpholinyl radicals, and the amic acid is selected from the group consisting of hexahydrophthalamic acid, 1,2,3,6-tetrahydrophthalamic acid, 3,6-endoxy-$\Delta^4$-tetrahydrophthalamic acid and 3,6-endomethylene-$\Delta^4$-tetrahydrophthalamic acid, and the alkali metal, ammonium or amine salts and imides of said N-disubstitutedamino amic acids.

12. The method of regulating plant growth which comprises treating seeds with a plant dwarfing effective amount of N-dimethylamino-3,6-endomethylene-$\Delta^4$-tetrahydrophthalamic acid.

13. The method of regulating plant growth which comprises incorporating in soil in which seeds are planted a plant dwarfing effective amount of a compound selected from the group consisting of N-disubstitutedamino amic acids, in which the disubstituted amino radical is selected from the group consisting of dialkylamino radicals having 1 to 12 carbon atoms in each alkyl group, 1-pyrrolidyl, 1-piperidyl and 4-morpholinyl radicals, and the amic acid is selected from the group consisting of hexahydrophthalamic acid, 1,2,3,6-tetrahydrophthalamic acid, 3,6-endoxy-$\Delta^4$-tetrahydrophthalamic acid and 3,6-endomethylene-$\Delta^4$-tetrahydrophthalamic acid, and the alkali metal, ammonium or amine salts and imides of said N-disubstitutedamino amic acids.

14. The method of regulating plant growth which comprises incorporating a plant dwarfing effective amount of N-dimethylamino-3,6-endomethylene-$\Delta^4$-tetrahydrophthalamic acid in soil in which seeds are planted.

References Cited by the Examiner
UNITED STATES PATENTS 3,084,167  4/1963  Rice _____ 260—319

LEWIS GOTTS, *Primary Examiner.*

JAMES O. THOMAS, JR., *Examiner.*